US006244302B1

United States Patent
Vikanes

(10) Patent No.: US 6,244,302 B1
(45) Date of Patent: Jun. 12, 2001

(54) METHOD AND DEVICE FOR DRAINING HUMIDITY FROM INSULATION

(76) Inventor: Lars Hogne Vikanes, Post Box 57 Ovågen, Rong (NO), N-5337

( * ) Notice: Subject to any disclaimer, the term of this patent is extended or adjusted under 35 U.S.C. 154(b) by 0 days.

(21) Appl. No.: 09/485,673

(22) PCT Filed: Aug. 27, 1998

(86) PCT No.: PCT/NO98/00258

§ 371 Date: Feb. 23, 2000

§ 102(e) Date: Feb. 23, 2000

(87) PCT Pub. No.: WO99/10678

PCT Pub. Date: Mar. 4, 1999

(30) Foreign Application Priority Data

Aug. 27, 1997 (NO) .............................................. NO973951

(51) Int. Cl.[7] .................................................. F16L 55/07
(52) U.S. Cl. .................. 138/104; 138/149; 138/177; 138/178; 62/285; 62/290
(58) Field of Search ................................. 138/149, 104, 138/177, 178, DIG. 11; 62/273, 281, 285, 288, 290

(56) References Cited

U.S. PATENT DOCUMENTS

| 3,120,111 | * | 2/1964 | Simmons . | |
|---|---|---|---|---|
| 3,217,093 | * | 11/1965 | Colarato | 138/109 |
| 3,354,742 | * | 11/1967 | Tschanz et al. | 138/109 |
| 3,804,438 | * | 4/1974 | Humphries et al. | 138/149 |
| 4,673,652 | * | 6/1987 | McStravick et al. | 138/149 |
| 4,700,751 | * | 10/1987 | Fedrick | 138/109 |
| 5,520,009 | * | 5/1996 | Jepsen et al. | 62/281 |
| 5,520,220 | * | 5/1996 | Barton | 62/281 |
| 5,975,797 | * | 11/1999 | Thomas et al. | 405/45 |
| 5,996,637 | * | 12/1999 | Larsson | 138/110 |

FOREIGN PATENT DOCUMENTS

| 3446435 | 7/1986 | (DE) . |
|---|---|---|
| 0391177 | 10/1990 | (EP) . |
| 2220459 | 1/1990 | (GB) . |

* cited by examiner

Primary Examiner—James Hook
(74) Attorney, Agent, or Firm—Christian D. Abel

(57) ABSTRACT

A method and device for drawing off humidity, such as condensation fluid, from an insulation layer around apparatuses, such as pipe lines and the like. The method is characterized in that a hollow body, such as a sleeve is arranged in a passage in the insulation material, and where a number of openings in the wall portion of the hollow body or the sleeve communicates with the surroundings outside the insulation layer, whereby condensation fluid can be drawn off from the insulation layer to the surroundings via the hollow body in the form of the sleeve.

14 Claims, 2 Drawing Sheets

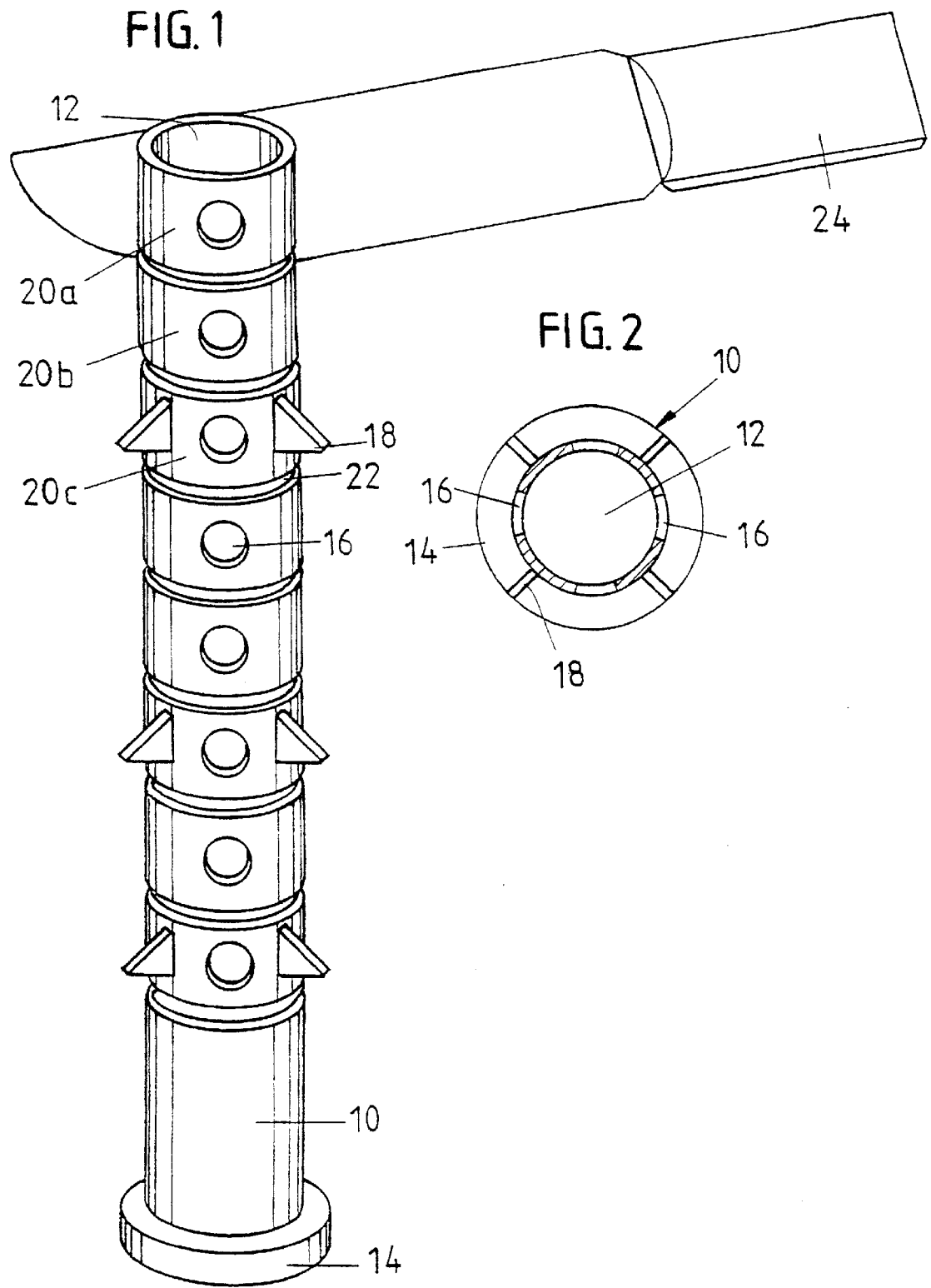

METHOD AND DEVICE FOR DRAINING HUMIDITY FROM INSULATION

The present invention relates to a method and device for drawing off humidity, such as condensed humidity (condensation fluid), from insulation layers around apparatuses, pipe conduits and the like, as are indicated in the introduction to the subsequent claims 1 and 8, respectively. The invention thus has to do with a novel construction of an insulation system for draining or drawing off condensation fluid.

The method and device are especially intended for application for draining any moisture/condensation from insulation materials which are arranged around apparatuses and pipe lines in which fluids, such as liquids and gas are conveyed or stored, or in apparatus where processes occur which involve being able to form condensation on the surface of the apparatus or the pipe line. Such condensation is formed on the hot side of a boundary surface between a cold fluid and a hot gas fluid when the latter includes a condensable gas. In the present instance, when a colder fluid is conveyed through a pipe line while the surroundings represent the hotter fluid, the pipe outer wall constitutes said boundary surface (the hot side).

It is usual to arrange a mantle of insulation around pipe lines which convey fluids. In addition to the insulating effect, the insulation layer also provides protection against mechanical damage. Usually the mantle of insulation comprises a sleeve-shaped layer of the insulation material itself which surrounds the pipe. The outer side of the insulation material is usually covered by a thinner cover layer in the form of weather-protecting cover cloth, that is to say a metal or plastic layer. The cover layer can be water-tight so that water, from rain and the like, does not penetrate into the insulation itself. The drawback with the sealed cover layer is however that it also involves condensation being able to be simultaneously locked inside the insulation, which can entail the occurrence of corrosion on the pipe surfaces. Furthermore the insulating effect of the insulating material is reduced as a result of the accumulated moisture.

GB patent application No. 2.220.459 discloses a pipe surrounded by a water repellant insulation material and an outer cover. The insulation material includes profiles on its outer surface, thus forming a pattern of cavities beneath the cover. Water entering the cover may evaporate due to the heat from inside the pipe, and may return outwards through the cover. Thus this patent publication does not relate to the solving of the same problem as the present invention, where cold fluids being transfered through pipes resulting in the formation of liquid water condensation, and where a need exist to remove the humidity from the insulation by ventilation.

If the fluid has a higher temperature than the surrounding air the insulation contributes to prevent heat losses from the pipe line. And correspondingly, if the fluid has a lower temperature, the insulation prevents a rise in temperature of the pipe fluid. When air having a temperature higher than the temperature of the pipe fluid comes into contact with the pipe wall, a portion of the air humidity will condense against the colder pipe surface. This problem with condensation which is confined within the insulation material applies of course not only in connection with pipe lines, but also in connection with fluid-carrying apparatuses, such as tanks, containers and the like (for example in connection with refrigerating plants) where these are insulated in a similar fashion so as to prevent heat transfer between the fluid within the tank or the container and the surroundings.

In the following the expression drain is employed so as to cover being able to vent the insulation of moisture-containing air, and being able to draw off liquid state condensation water, by employing the device according to the invention.

It is an object of the present invention to provide a method and a device which can prevent or reduce the problems which arise in connection with such condensation within pipe line insulations.

It is also an object of the present invention to provide a device which can also contribute to a lower venting of any humidity (such as steam-formed humidity) in the insulation itself. This means that condensation, both in liquid and steam form can escape the insulation.

The method according to the present invention is characterised by the features which are evident from the characterised portion of the following claim 1, and preferred embodiments are indicated in the dependent claims 2–7.

The device according to the present invention is characterised by the features which are evident from the characterised portion of the following claim 8, and preferred embodiments are indicated in the dependent claims 9–13.

The device according to the present invention is defined as a hollow space-forming body, and according to the most preferred embodiment this body is designed as a sleeve having a through duct. The duct itself thus constitutes the above-defined hollow space, while the one of the duct openings of the sleeve constitutes the said at least one opening which forms a connection between the hollow space and the surroundings outside the insulation layer.

The invention shall now be explained further with reference to the accompanying Figures, wherein:

FIG. 1 shows a perspective view of a construction of the drain device according to the invention.

FIG. 2 shows a cross-section of the drain sleeve according to FIG. 1.

Figure 3:
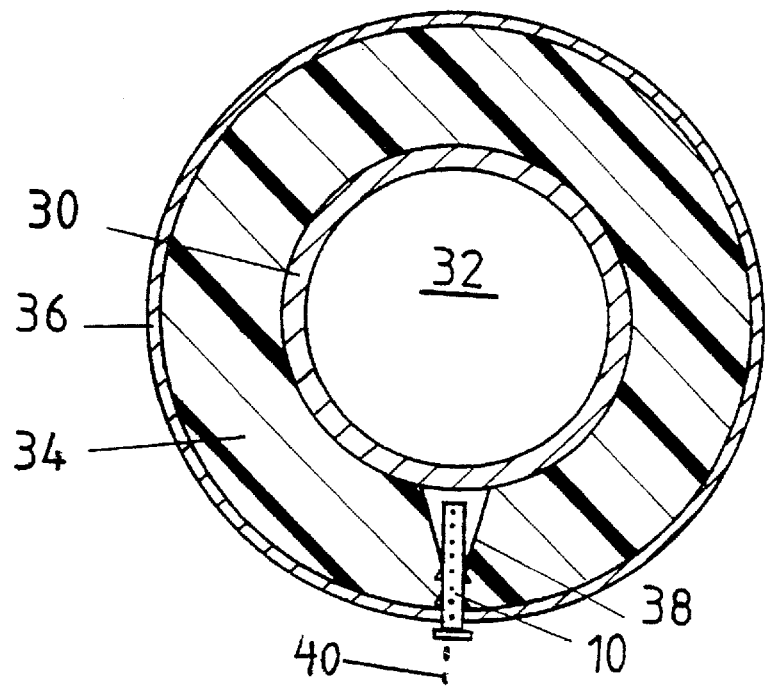
FIGS. 3 and 4 show respectively a perspective view and a cross-section of an insulated pipe where the drain sleeve comes into use.

As is evident from FIG. 1, the drain sleeve 10 comprises an elongate pipe or a sleeve which forms a hollow internally elongate and through passage 12. In the one end portion the sleeve 10 comprises a flange or base portion 14.

Along the length of the whole sleeve 10 there are arranged a number of openings or bores through the wall of the sleeve. The openings can form a regular or irregular pattern. On the outer side of the sleeve there are further arranged a number of elevations 18. The elevations have a form like barbs which cause the sleeve to be slidably displaced relative to a woven or other surface, the one way, but will have a tendency to stick on slide displacement the other way. The elevations can thus comprise studs 18 projecting outwardly from the surface of the sleeve which face outwards and backwards in a direction towards the flange 14.

In FIG. 1 the drain sleeve is illustrated in the form of a pipe having a circular cross-section, but the drain sleeve can have other cross-sections, for example it can be more oval or polygonal.

The drain sleeve 10 according to the invention is preferably made of plastic, and it can be made in alternative ways, such as by injection moulding, or by extrusion with subsequent working in order to form inter alia the openings in the pipe wall. It is an advantage to employ a sleeve material which has a low heat conductivity.

In order to be able to adjust the length of the drain sleeve according to the current need, the sleeve is divided into a number of sleeve sections 20a,20b,20c. Each sleeve section 20a,20b,20c is separated from adjacent sleeve sections by a groove or a depression which is arranged around the periphery of the sleeve, and which functions as a fissure or attenuation line). The grooves 22 are formed by the wall thickness of the sleeve in this portion being somewhat less than in the remaining sleeve portion. A sleeve section can be readily separated from the sleeve by cutting off along a groove.

The sleeve illustrated in FIG. 1 can have a total length of 100 mm. For each 1 cm. a groove can be designed and by cutting off according to need the precisely suitable drain sleeve can be produced, that is to say completely down to a length of 20 mm. As a cutting tool there can be employed a conventional sharp knife, illustrated at 24. According to a preferred embodiment the outer end of the sleeve which is situated outside the insulation comprises a dome-shaped (convex) end portion having a centrally disposed opening hole which has smaller transverse dimensions than the internal cross-section of the sleeve, and through which opening condensation water can freely flow outwards from the sleeve.

In FIG. 2 there is illustrated a cross-section of the sleeve seen from above. The passage 12, the openings 16, the sleeve wall, the base-forming flange 14 and the rows of barbs 18 are evident from FIG. 2.

Figure 4:
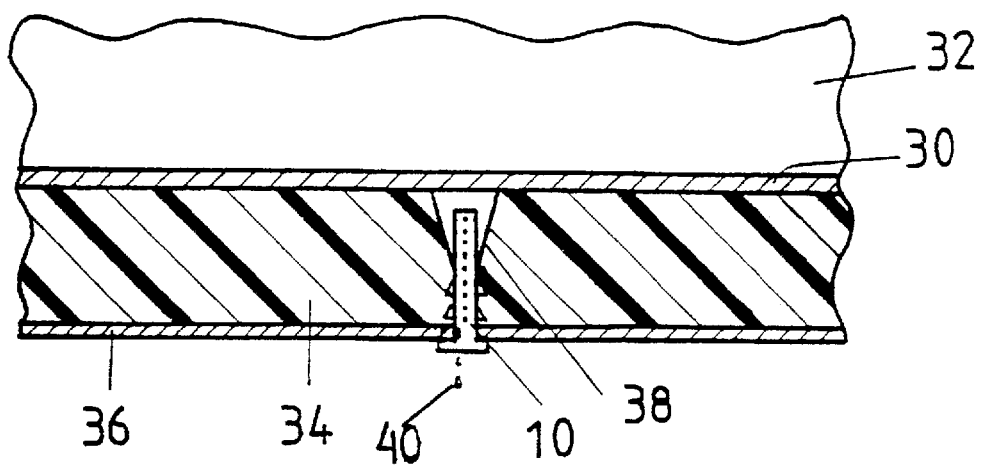

In FIGS. 3 and 4 there are shown a cross-section and a partial longitudinal section of an insulated pipe, for example a steel pipe, where the drain sleeve is well suited for use.

According to an example the pipe 30 conveys a fluid in its internal space 32. On the outside of the pipe 30 there is surroundingly arranged an insulation 34 having a given layer thickness, and an outer cover layer (a mantle) 36 is arranged coveringly on the outside of the insulation.

The drain sleeve 10 according to the invention shall now be employed for draining out condensation water which lies in the insulation, and especially completely inside at the surface of the pipe. First an opening is made in the cover layer, and by means of a suitable tool a passage 38 is now made through the insulation material 34 forwards towards the pipe wall. The passage through the pipe wall has a somewhat smaller diameter than the diameter of the sleeve. Now the drain sleeve 10 is cut so that it has the correct length and reaches almost forward to the outer wall of the pipe 30. The end of the sleeve is thrust into the mouth of the duct 38 through the cover layer, and the sleeve is inserted into the duct until the flange 14 halts the inward movement of the sleeve in that it pushes against the outer surface of the cover layer. During the insertion the insulation material is forced somewhat to the side, and the barbs are infiltrated in the adjacent fibres of the insulation material. Thereby the sleeve cannot fall out of the passage by itself.

Now the sleeve is mounted, and any occurring condensation water and/or moist air can flow into the duct 12 through the holes 16 through the wall, and condensation water can run along the inside of the sleeve towards its mouth and out as drops, illustrated at 40 in FIG. 3. For the condensation water to be able to run out by the force of gravity, the drain sleeve is preferably installed according to the invention from below through the insulation material and upwards towards the overlying pipe wall. In order to obtain a sufficient diversion of condensation, a number of such drain sleeves are installed in a corresponding manner in the insulation in a regular or irregular pattern along the pipe 30.

In order to obtain a general venting of moisture from the insulation, it is also possible to install such drain sleeves around the whole periphery of the insulation/pipe. Since the installation of a sleeve can to a certain degree in itself reduce the ability to insulate of the insulation layer, this circumstance, that is to say how tightly the installed sleeves are placed, must therefore be considered precisely in each individual case.

The drain sleeve can now remain standing as a permanent drain sleeve in the insulation of the pipe, and uniformly draw off condensation from the insulation material.

In that condensation water can now be removed by means of a single drain sleeve which at the same time will involve a certain drying up of the insulation, the danger of the attack of corrosion is heavily reduced on the pipe material 30. Besides the insulating effect of the insulation material will be greatly enhanced when it is now kept in a drier and airier condition.

The invention is not to be limited to applying the special design of a pipe or a sleeve for drawing off condensation from the insulation. Thus there can generally be used a hollow space-forming body, such as is defined in the dependent claims, and which can have a number of openings in the wall for the admission of condensation to the hollow space, and at least one opening which can release the condensation further outwards to the surroundings. This means that the body can have many alternative external forms. For example the body can be rectangular or polygonal. However a pipe or sleeve shape will be the most practical and preferred form of the present invention.

What is claimed is:

1. A method for drawing off humidity, including condensation fluid, from a layer of insulation material around apparatuses, pipe lines and the like, comprising the steps of:
   a. providing one or more hollow, space-forming bodies, each said hollow, space-forming body comprising a wall portion having a plurality of openings;
   b. creating one or more passages extending into the interior of the insulation material; and
   c. arranging one of said hollow, space-forming bodies in each said passage in the insulation material such that at least one of said openings communicates with the insulation material and at least one of said openings communicates with the surroundings outside the layer of insulation material,
   whereby the humidity can be drawn off from the layer of insulation material to the surroundings via the hollow body.

2. The method according to claim 1, wherein said hollow, space-forming body is a sleeve having a through duct, and whereby a plurality of openings in the wall portion of said sleeve form a fluid connection between said duct and the insulation material, and further whereby one end of said duct is in communication with the surroundings outside the layer of insulation material, such that the humidity can be drawn off through said openings into said duct and further to the surroundings.

3. The method according to claim 2, further comprising the step of adapting the length of said sleeve to the layer thickness of the insulation material prior to arranging said sleeve in said passage.

4. The method according to claim 3, further comprising the step of arranging said sleeve in said passage so that one sleeve end is positioned substantially adjacent to the surface of the apparatus/pipe line and the other sleeve end projects extending out approximately in the boundary region between the surroundings and the surface of the insulation layer.

5. The method according to claim 4, wherein said sleeve further comprises a stop flange at one end which is adapted, during installation of said sleeve, to impact against the outer surface of the insulation material.

6. The method according to claim 5, wherein said sleeve further comprises anchoring means which prevent said sleeve from sliding out from the insulation layer after said sleeve is installed.

7. The method according to claim 6, wherein said anchoring means comprise a plurality of barbs projecting from the wall portion of said sleeve, said barbs being adapted to engage with the insulation material.

8. The method according to either of claims 1–7, wherein said passage is created from below and upwards into the insulation material, whereby humidity in the liquid state may be drawn off by the force of gravity.

9. A device for use in an insulation system for drawing off humidity, including condensation fluid, from a layer of insulation material around apparatuses, pipe lines and the like, comprising:
   a. a hollow, space-forming body having a wall portion, said hollow, space-forming body being adapted to be arranged in the layer of insulation material;
   b. a plurality of openings in said wall portion, at least one of which forms a connection between the hollow space and the insulation, and at least one of which forms a connection between the hollow space and the surroundings outside the insulation layer; and
   c. anchoring means for preventing the body from sliding out from the insulation after it is installed.

10. The device according to claim 9, wherein said hollow, space-forming body is a sleeve with a through duct, and wherein a plurality of openings in the wall portion of said sleeve form a fluid connection between said duct and the insulation, such that the humidity can be drawn off into and further through said duct to the surroundings.

11. The device according to claim 10, wherein said anchoring means comprise barbs projecting from the wall portion of said sleeve, said barbs being adapted to infiltrate the adjacent fibers of the insulation material.

12. The device according to claim 11, further comprising a stop flange arranged at one end of said sleeve, such that, during installation, said stop flange will impact against the outer surface of the insulation material.

13. The device according to claim 12, wherein said sleeve is divided into a plurality of selectively removable segments, such that the length of said sleeve may be cut down by removing one or more of said segments.

14. The device according to claim 13, wherein said selectively removable segments are formed by means of grooves or attenuation lines integrated around the circumference of the wall portion of said sleeve.

* * * * *